United States Patent Office 3,551,203
Patented Dec. 29, 1970

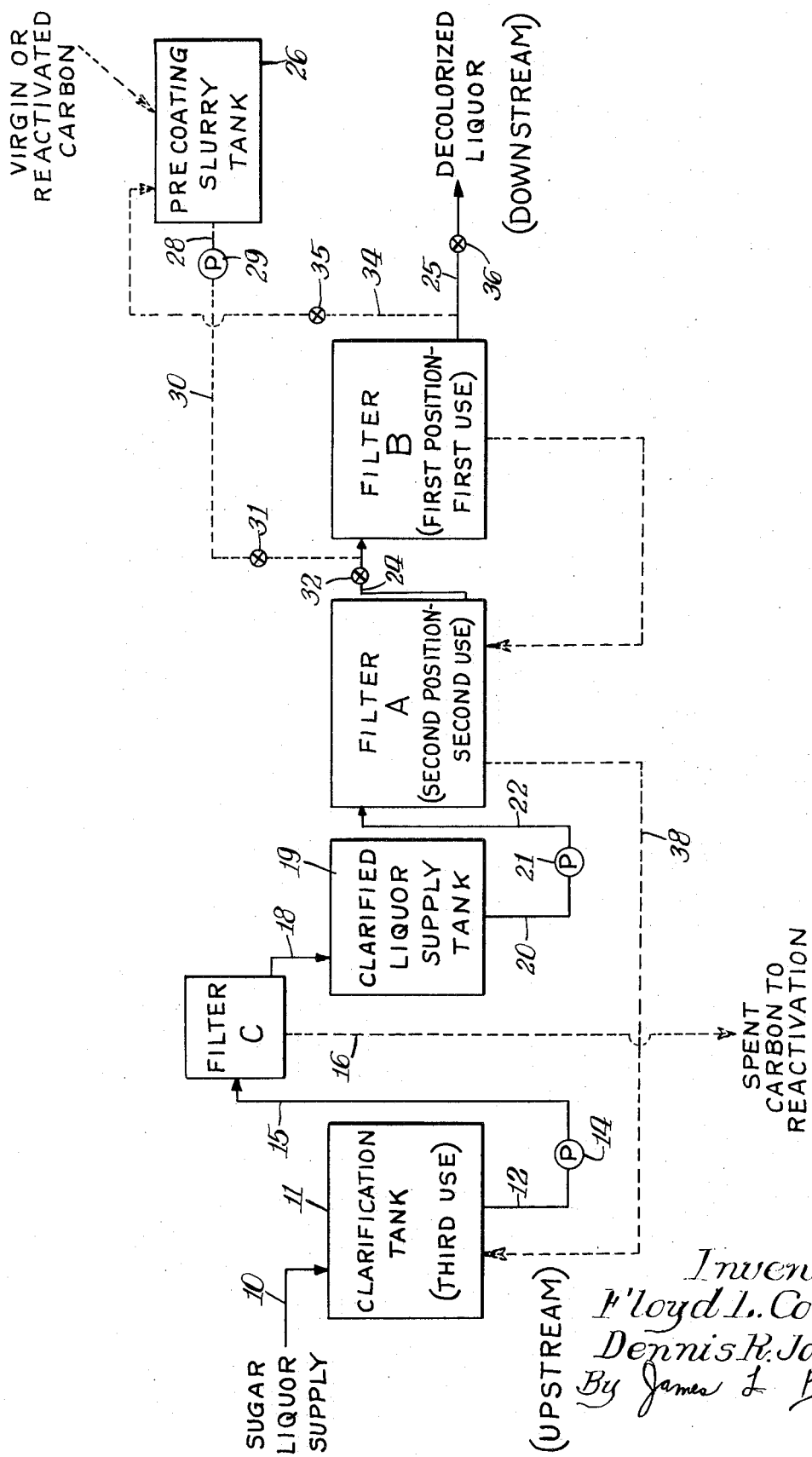
Dec. 29, 1970  F. L. CORSON ET AL  3,551,203
METHOD OF PURIFYING SURGAR LIQUORS
Filed Aug. 30, 1967
Inventors:-
Floyd L. Corson
Dennis R. Johnson.
By James L. Bailey
Atty.

3,551,203
METHOD OF PURIFYING SUGAR LIQUORS
Floyd L. Corson, Brookfield, and Dennis R. Johnson, Bellwood, Ill., assignors to CPC International Inc., New York, N.Y., a corporation of Delaware
Filed Aug. 30, 1967, Ser. No. 664,433
Int. Cl. C13d 3/12
U.S. Cl. 127—46          23 Claims

ABSTRACT OF THE DISCLOSURE

A method of purifying and decolorizing sugar liquors, such as starch hydrolysates, which includes the steps of passing these liquors through a plurality of filters whereby the downstream filter contains the freshest carbon filter cake. The filters are periodically substituted by cutting in downstream a fresh filter while simultaneously cutting out the filter that has been in service for the longest time. The filters contain cakes of finely divided powdered activated carbon and are of a critical depth, $1/16$–1.5 inches.

The treatment of sugar liquors such as corn syrup, cane sugar, relatively impure solutions of dextrose, etc. is one of the oldest of established industrial chemical procedures, and consequently is a very highly developed art. Still, extensive time and money are spent each year on research and development work designed to improve existing methods in this field. A large percentage of such research and development is concerned with improving processes for decolorizing and purifying sugar liquors.

Many agents have been suggested from time to time in aiding or modifying procedures for the decolorization of sugar liquors. Among these may be mentioned carbonaceous materials of various types such as bone char, granular carbon, etc. Again, these reagents are employed in a wide variety of techniques. One of the more successful uses of carbon materials such as activated carbon is carried out by slurrying the carbon in the impure liquor one or more times, followed by filtration of the decolorized liquor. In some instances, the slurry technique is utilized in conjunction with a separate step involving an already fixed filter cake.

While the just described procedure has had relatively wide acceptance, it would be a step forward in the art if a new and more efficient method of purification and decolorization were discovered. Particularly, the art would be advanced if such a procedure could be devised to produce products of acceptable color and purity, but yet required substantially less total carbon dosage in the overall process, compared to conventional techniques. The devised method would be particularly attractive if it were especially useful in removing contaminants and troublesome impurities such as hydroxymethyl furfural and some of its polymers which occur rather widely, particularly in starch hydrolysate liquors such as corn starch hydrolysate. These contaminants are responsible for subsequent development of a large percentage of the color present in the sugar solutions.

In view of the above it therefore becomes an object of the invention to provide a new and improved method for purifying and decolorizing sugar liquors.

A more specific object of the invention is to provide a process for the purification and decolorization of starch hydrolysate liquors such as corn syrup, and solutions of dextrose which require further treatment.

Yet another object of the invention is to provide a new process for the simultaneous decolorization and purification of sugar liquors so as to produce sugar liquors of relatively high purity and freedom from color, which are particularly substantially free of relatively low molecular weight impurities such as hydroxymethyl furfural or related color-causing materials.

A still further object of the invention is to provide a method of purifying sugar solutions through the use of a special carbon source which is utilized in a unique manner to produce final products of exceptional purity.

Yet another object of the invention is to provide an efficient method of purifying sugar liquors utilizing a special carbon source, which process may be effected at a relatively high throughput, and is adaptable to the treatment of a wide variety of sugar liquors such as corn syrup and dextrose solutions.

A still further object of the invention is to provide a practical purifying and decolorizing treatment of the kind described, that is eminently suitable for use in continuous and semi-continuous modes of treatment.

Still another specific object of the invention is to provide a method of treating sugar liquors whereby the treatment allows realization of any desired level of color of the treated liquor.

Still further objects in the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The single figure of drawing is a simplified schematic drawing showing one arrangement of the equipment for use in the practice of one preferred embodiment of the process of the invention. The path of flow of the sugar liquor, that is to be treated, is generally from left to right, and is shown by the solid lines, with arrows indicating the direction of flow. Although the filter cakes do not move from one filter to another, the relative positions of the filters in the process changes, and the progression of the carbon filter cake, from use in one operation to use in a succeeding operation upstream, is shown by the broken lines, with arrows indicating the direction of the progression. For simplicity, the arrangement of piping and valves, that permits shifting the relative positions of the filters is not shown; it can readily be understood.

The present invention involves simultaneously decolorizing and purifying sugar liquors by passing an aqueous sugar liquor through a plurality of filters connected in a series arrangement. The upstream filter in the series, that has been under liquor pressure for the longest time, is periodically cut out, while substantially simultaneously cutting in, as the last downstream filter in the series, a fresh filter containing fresh carbon filter cake. The remaining filters are connected in operating positions each one position upstream respectively.

In order to make this new technique work to best advantage, the filters must contain cakes of powdered activated carbon. The particulate carbon must be of a subdivision such that at least 90%, and preferably 95%, of the particles are less than 100 mesh in diameter and at least 70% less than 325 mesh. In addition, each filter cake should have a thickness ranging from about 1/4 inch to about 1 inch. If there is a substantial deviation from the particle size of carbon or from the cake thickness suggested here, considerable over-all process efficiency is lost even though the techniques of plural filters, periodic replacement of upstream filters, and repositioning of remaining filters are practiced, in conjunction with insertion of fresh carbon filter cake downstream in the series. That is, the total combination of steps and particular use of the carbon medium described here must be practiced to enable one to achieve the advantages of the invention.

A typical carbon source useful in the invention described herein is supplied by West Virginia Pulp and Paper Company under the trade name "Nuchar CEE." For example, this carbon source is particularly useful when a filter cake is used having a thickness ranging from about 0.5 to about 1.0 inch of cake with each square foot of a 1 inch cake containing approximately 1.2 pounds of carbon. A typical material of this type has the following analysis:

TABLE I

Fineness:
 Through 100 mesh—91–99
 Through 200 mesh—70–90
 Through 325 mesh—50–75
Density:
 Lbs. cu./ft.—15–17
 Surface area—700–950
 Pore volume (cc./gm.)—0.9
 pH distilled water extract—4.5–6.0
 Molasses value—151–170
 Iodine value—90–96
 Filtering speed (seconds)—100–130
 Percent water solubles—3% max.
 Percent total ash—6% max.
 Percent moisture—3% max. when packed.

Another typical carbon source to prepare useful carbon filter cakes is supplied by Atlas Chemical Industries Incorporated under the trade name "DARCO S-51." A material of this type is most preferably utilized when a cake thickness of 0.25–0.5 inch of cake is prepared. Here, one square foot of a 0.5 inch cake is approximately equal to 1.2 pounds of carbon. A typical material of this type analyzes as follows:

TABLE II

Moisture content (max. as packed)—12%
Water-solubles (determined by four leachings with boiling water)—1%
Acid-solubles (determined by leaching with 1:1 hydrochloric acid)—3%
Ash—17–24%
pH of water extract—5.0–7.0
Bulk density, pound/square foot (determined by 30-minute tamping test)—27–33
Mesh size:
 Percent through 100-mesh screen—95
 Percent through 325-mesh screen—70
Filterability—Excellent
Wetability—Excellent By way of further illustration of the invention a battery or group of 2 to 5 filters may be arranged in series. This battery may also contain one or more filters not in use, which will at the same time be in the process of "sweetening off," washing, emptying and being precoated with either fresh or reactivated carbon. The impure sugar liquor, that is to be filtered, is first contacted with the filter containing carbon that has been in use longest. The next filtration step is through the activated carbon cake of next longest use, and so on, until the final carbon cake in contact with liquor is the freshest carbon.

When the process is first started, each filter is charged with a cake of fresh activated carbon or reactivated carbon. However, once normal operating conditions are established, only one filter bed in the series is generally "fresh" at any one time.

When the treated liquor from the filter battery begins to run "off color," that is, begins to discharge liquor below the requisite purity or above the color specification, a fresh filter unit is cut in that contains fresh carbon, which becomes the furthest downstream filter. The filter containing the spent carbon cake is taken out of the series, from its position furthest upstream, and is "sweetened off," washed, emptied of spent carbon, and the spent carbon is then disposed of or reactivated. After this filter bed has been filled with fresh or reactivated carbon, it is held in readiness for further use in the series. Thus, the invention is particularly adaptable to close product control, since when the average color of the treated liquor leaving the filter battery has reached a predetermined maximum allowable level, a filter containing fresh carbon cake is cut in as the furthest downstream filter of the series contacted by the sugar liquor. In some instances if a product of highest quality is desired this filter is cut into position as soon as it has received a fresh carbon cake, without removing the oldest filter from service.

In addition to criticality of activated carbon particle size, the thickness of the filter cake has a good deal to do with over-all efficiency of the process. For a given flow rate, the total thickness of all the filter cakes in the flow stream is generally dictated by the difficulty of decolorizing and the desired purification of the liquor to be treated. Contact time is related to cake thickness and flow rate; therefore, higher flow rates would require thicker minimum cake thicknesses to accomplish the desired purification of the process stream. In particular, the thickness of each filter cake in the battery of filters should usually range from about 1/16 inch to about 1½ inches, and preferably is ¼ inch to about 1 inch. Cake thickness requirement is dependent upon bulk density of the carbon, operating pressure of the filter and flow rate of the treated liquor. One particular carbon may have twice the bulk density of a different source and would therefore require a minimum cake thickness of say ¼ inch while the second carbon source would require ½ inch of cake to accomplish the desired purification of the process sugar stream. The maximum cake thickness on each filter is dependent upon bulk density, operating pressure, and flow rate. Normally one would use the thickest cake compatible with the operating pressures available. For example, a ½ inch cake of a dense carbon may give the desired flow rate at 60 p.s.i. pressure drop and result in a treatment cycle time of 2 hours. If the pressure limitation on the filter were raised to 100 p.s.i. the cake thickness could be increased to ¾ inch and the treatment cycle increased to 3 hours. If on the other hand the bulk density of another carbon source is one-half that of the above carbon then the cake thickness in the previous example would be increased from ½ inch to 1 inch and from ¾ inch to 1½ inches in the respective illustrations. Cycle time would be increased proportionately to the amount of additional carbon in the filter due to the increased cake thickness.

The type of filter may be widely varied. One excellent type of filter apparatus is a leaf filter. Again, depending upon the particular source of carbon, desired depth of filter cake, and other variables involved, the actual amount of carbon utilized per square foot of filter area may be somewhat varied. Usually, good results are realized if 0.5–1.5 pounds of activated carbon per square foot of filter area is employed. More often 0.6–1.2 pounds of carbon per square foot of filter area is utilized in the instant invention.

The actual flow rate through the series of filters containing carbon cakes is usually dependent upon the viscosity of the liquor being treated, the temperature of treatment, filter cake thickness, source of powdered activated carbon, degree of subdivision, permitted operating pressures and other factors apparent to those skilled in the art. Usually a flow rate of about 5 to about 40 gallons per hour per square foot of filter area is maintained, to achieve the desired end results of exceptional purity and lack of color.

In one embodiment of the invention, the furthest downstream filter is precoated with carbon before the filter is put into the operation. Either water or previously treated sugar liquor may be used for precoating. Precoating conditions that will provide a smooth even cake of carbon in a short time with no carbon settling should be used.

In still another preferred embodiment of the invention, prior to treatment of the sugar liquor with the series of filters, the supply liquor is first slurried with partially spent carbon in a clarification step. The carbon that may be utilized here is preferably carbon from the filter most recently cut out of the filter battery. The primary purpose of the clarification step is to remove small insoluble particles of fats and solids which cause a haze in the liquor and the blinding of the in-place carbon cakes. While this is the preferred embodiment of the invention, it will be understood that other methods may suitably prepare the liquor for in-place treatment. These might include centrifuging, or use of rotary precoat filters, or pressure filters with filter aids such as diatomaceous earth. Some color, of course, is also removed in the clarification step. Usually the liquor is held from about ¼ hour to about ½ hour in contact with the carbon in form of a slurry. A typical clarification step is conducted for 30 minutes at 160° F. to insure maximum decolorization thereafter. The liquor is then filtered to remove the carbon and insolubles and the filtrate is then ready for decolorization.

The time lapse allowed before cutting in a new filter is largely dependent upon the degree of purification and decolorization desired. That is, a longer period of time lapse before cutting in a fresh filter is the furthest downstream filter will give a product having a lower average degree of purity and a greater degree of color. In the usual situation, a typical commercial scale run is carried on for 2–10 hours before a fresh filter is placed in the series. However, depending upon equipment, pounds of carbon cake per square foot of filter area, flow rate of liquor, type of supply liquor and its degree of impurity, etc., this time may vary widely from one operation to another.

The operation is particularly suitable in removing hydroxymethyl furfural and its polymers which themselves are color bodies or cause formation of color bodies. Both the hydroxymethyl furfural and the color bodies are removed in the overall process. The process reduces the average color of the treated liquor many times, regardless of the analytical type of measurement of color intensity utilized. In the typical case the average color of the finally treated liquor is reduced in intensity 2–10 times its former average figure. Usually color intensity measurements are effected photometrically.

The filtration steps may be run on either hot or room temperature liquors. Usually, the decolorization is effected upon liquors having an average temperature ranging from about 120° F. to about 180° F., and more often at temperatures of 155–165° F. Heating the supply liquor tends to increase the throughput rate due to lowering of viscosity, and also aids in the decolorization phenomenon itself.

After removal of a spent carbon cake from the system, the used carbon can be reactivated by a number of methods. Thus, the carbon can be reactivated by treatment with alkali solutions, by destructive distillation, or by mild oxidation at elevated temperatures, or by any combination of these, e.g., one method followed by another. A preferred method of reactivation is to heat the carbon in a mildly oxidizing atmosphere, at a temperature in the range between about 900° F. and 2000° F.

The process is applicable to purification and decolorization of any aqueous liquid containing a sugar component. Thus, for example, the sugar liquor may be a cane, corn, beet, etc. sugar liquor, preferably having a solids content between 10% and 60% by weight. The new process is especially useful in the treatment of corn starch hydrolysates such as corn syrup, and dextrose solutions. Thus, for example, corn syrups having a D.E. (dextrose equivalent) ranging from about 25 to about 75 are eminently susceptible to treatment in this operation. Again, dextrose solutions having a D.E. greater than say about 80 are equally amenable to processing via the steps of the instant invention.

Thus, the term "sugar liquors" is meant to include aqueous solutions containing mono-, di- and higher polysaccharides giving the liquors different degrees of sweetness, and it particularly includes sugar liquors derived from cane, beet and corn sources.

As mentioned above, the invention is particularly adaptable to purification of starch hydrolysates such as corn syrup and dextrose solutions. By the term "starch hydrolysate" is meant an aqueous liquid derived from acid, enzyme or other treatment of starchy materials to yield products having different types of sugar constituents. The starch hydrolysate used in practicing the invention may be derived from any starchy vegetable source, such as, for example, corn, wheat, potato, tapioca, rice, sago and grain sorghum. Waxy starches may also be the source of a starch hydrolysate.

Referring now in detail to the drawing, sugar liquor, such as corn syrup, is delivered through a sugar liquor supply line 10 to a clarification tank 11. A syrup-used carbon slurry is formed in the clarification tank 11, using the used carbon from filter A, which will be described presently. The tank 11 is connected by a drain line 12 to a pump 14, which delivers slurry from the tank 11 through a line 15 to the filter C.

The filter C may be of any desired type. One preferred filter, for use at this point, is a rotary drum filter with an endless cloth filter element. The filter C separates the carbon from the clarified liquor. The separated, spent carbon is sweetened off and is then discharged from the filter C, as indicated by the dashed line 16, and may be reactivated or discarded. The clarified liquor is transferred through a discharge line 18 into a supply tank 19.

The clarified liquor supply tank 19 is connected through a line 20 to a pump 21, that delivers the liquor through a line 22 to the upstream decolorizing filter A. The filtrate from filter A flows through a line 24 to the downstream decolorizing filter B. The filtrate from filter B is discharged through a line 25 as decolorized liquor. To place the decolorizing filters in operation, initially, the precoating slurry tank 26 is used. Either virgin or reactivated carbon is slurried in this tank with water or decolorized liquor. To permit precoating of filter B with carbon, the slurry tank is connected through a line 28 with a pump 29 that discharges through a line 30 that connects to the inlet of filter B. A valve 31 is disposed in the line 30, to close it off when it is not in use. Similarly, a valve 32 is disposed in the line 24, to permit the filter B to be isolated from filter A. A line 34 is connected to the outlet of filter B, to permit recirculation to the slurry tank 26 during precoating. A valve 35 is disposed in the line 34, to permit closing of that line during normal operations. Similarly, a valve 36 is disposed in the line 25, to permit closing that line during precoating.

In practicing the present invention, it is preferred to use at least three decolorizing filters. Only two are shown in the drawing, for simplicity in presentation. The third filter is out of use while the other two are in use. The decolorizing operation follows the illustration in the drawing. When a fresh filter must be cut in, filter A is cut out. The necessary piping is conventional and is not shown, to simplify this explanation. The carbon filter cake from filter A is transferred, as indicated by the broken line 38, to the clarification tank, for slurrying with the incoming sugar liquor in the tank 11. The valve settings (not shown) are adjusted to place filter B in the upstream operating position formerly filled by filter A. A fresh filter (not shown) is cut in to place the fresh filter in the operating position previously filled by filter B.

While filter A is out of service, it is precoated with fresh virgin or fresh reactivated carbon, by means of the precoating tank and connecting piping and accessories as shown connected to filter B, but not shown for filter A, for simplicity. The decolorizing operation need not be interrupted for these changeovers.

The decolorizing filters used in a particular demonstration of this decolorizing work were 23-gallon units. Each had two vertical leaves covered with 2 x 2 multifilament Dacron twill. The effective filter area was five square feet per filter. In addition to the supply and filtrate lines, a recycle line (not shown) led from the top of each filter to insure the formation of a uniform cake in the filter during pre-coating operation. By removing some carbon slurry from the top of the filter, any settling of the carbon in the filter became less significant. An air vent (not shown) was also located at the top, to bleed out entrained air from the filter body. An air header (not shown) was also connected to each filter to blow out the heel liquor before sluicing the partially spent carbon and to keep the cake on the filter leaves until the sluice cycle was started.

A 100-p.s.i.g. filtration pressure was developed during the decolorizing operation, by the centrifugal pump 21.

To demonstrate the invention, the system was started up by preparing a carbon slurry with supply sugar liquor, precoating the filters with carbon, filling the system with sugar liquor and heating the system to operating temperature. The tanks which held carbon slurries or supply liquors were agitated, and those tanks holding supply liquor were steam jacketed to bring the liquor to and maintain the liquor at the processing temperature of about 160° F.

Once the system was in operation, it was run long enough for the carbon in each of the decolorizing filters and slurries to reach the degree of color adsorption (exhaustion) that it would have in a conventional countercurrent adsorption system. This involved two filter changes, so that the third-use carbon, as used in clarification after use in filter B in the downstream position, then in filter B in the upstream position, was mixed in with the supply liquor after initial use as first-use and second-use carbon in decolorizing. Three cycle changes were run, before sampling, to insure this proper degree of carbon usage. Several additional cycles were run to obtain samples and data that would be representative of normal operation of the system.

During the operation, the supply liquor was fed into a 50-gallon, steam-jacketed, agitated, round-bottom clarification tank. Spent carbon was added, and the resulting slurry was pumped through the clarification filter C. The clarified filtrate was then fed into the supply tank 19.

The clarified filtrate was then pumped from the clarified liquor supply tank 19 through the decolorizing filter A. The filtrate from filter A was then passed through filter B, which contained a relatively fresh carbon filter cake. The filtrate from the final decolorization step was then evaluated.

The filters were left on-stream for predetermined intervals of time, or cycles. During the operation itself, the flow rates, temperature, and other variables were carefully controlled. Some of the specific demonstrations of the invention will now be described in detail.

EXAMPLE I

In this run the general conditions and arrangements outlined above were followed. A 30° Baumé solution of dextrose hydrolysate, having a D.E. of 95–99, was the supply liquor. The liquor was first clarified by a single-stage slurry treatment utilizing the partially spent carbon sluiced from the upstream filter A.

Excellent results were realized at a flow rate of about 12.0 gallons/hour/square foot filter area with 1.2 pounds of carbon per square foot of carbon cake in each decolorizing filter stage. These conditions allowed efficient carbon usage and permitted operation within a 100 p.s.i. filtration pressure drop. The thickness of the filter cakes were each about ½ inch.

Under these conditions, the carbon dosage calculated out to be 0.6 pound of carbon per 100 pounds of dextrose dry substance, a sugar liquor product having a color of 2.0 was realized, as compared to the starting liquor color of 10.0. The color was measured photometrically.

EXAMPLE II

In this test a 26° Baumé dextrose hydrolysate solution was utilized as the supply liquor. This sugar had a D.E. of 88–91. The same procedure as generally outlined in Example I was followed. Here the supply liquor had a color of 33, which was finally reduced in the process to a treated liquor color of 4.0. The flow rate was 16.0 gallons/hour/square foot through a 1.0 inch thick cake. This cake thickness was obtained by applying carbon at 1.2 pounds per square foot of filter area in the two decolorizing filters. Again there was about a 100 p.s.i. pressure drop. In the decolorizing step a total carbon dosage of 3.0 pounds per 100 pounds of dextrose solids was employed.

EXAMPLE III

Here an acid converted corn syrup was utilized in the process. A 20° Baumé supply liquor of a corn syrup, having a D.E. of 40 and a color of 5, was reduced to a final color of 0.35. A flow rate of 12 gallons/hour/square foot filter area was employed through filter cakes containing 0.6 pound of carbon per square foot of filter cake. A total carbon dosage of 0.31 pound of carbon per 100 pounds of solids was used.

The process is equally applicable to other starch syrups such as corn syrup having a D.E. ranging from say 32 to about 65.

EXAMPLE IV

In this test the procedure of Example II was compared with a prior art conventional system. This conventional system involved the combination use of an inplace filter cake followed by a slurry treatment. The filter cake was composed of once-used carbon, while the slurry was made up with virgin carbon mixed with liquor effluent from the first filtering step. The carbon used in the carbon filter cake in the initial treatment had formerly been virgin carbon utilized in the slurry step.

In order to decolorize the dextrose supply solution of Example II from a 30 color to a 10 color using the conventional system, approximately twice the carbon dosage had to be employed compared to the process of the invention. This was completely unexpected, and points to the heretofore unrealized advantages of the present invention.

While the invention has been illustrated with a two-stage or two filter unit, even more superior results are obtained with more than two filters, say up to five or more in series.

By the term "filter cake" as used in the instant invention refers to a cake or filter medium of powdered carbon 1/16–1.5 inch in depth and more often ¼–1 inch in depth. This should be distinguished from a "bed" of filter medium which utilizes a granular adsorbent usually 15–30 feet deep.

In addition to the apparent advantage in decreased carbon dosage, the present invention eliminates certain equipment cost and reduces over-all hold time compared to other conventional systems.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A process for the purification and decolorization of sugar liquors which comprises passing an aqueous sugar liquor through a plurality of filters, connected in series, periodically cutting out the upstream filter that has been under liquor pressure for the longest time, and substantially simultaneously cutting in as the last downstream filter in the series a fresh filter containing fresh carbon filter cake, said filters containing cakes consisting essentially of powdered activated carbon of a subdivision such that at least 90% of the particles are less than 100 mesh in diameter, with said cakes each having a thickness of 1/16–1.5 inch.

2. The process of claim 1 wherein the average color of said sugar liquor is reduced in intensity 2–10 times its former average figure.

3. The process of claim 1 wherein prior to said filtration steps the incoming liquor is initially clarified by slurry contact with a particulate carbon source.

4. The process of claim 1 wherein said series comprises 2 to 5 filter cakes.

5. The process of claim 4 wherein said filter cakes are each composed of 0.5–1.5 pounds of the carbon filter cake per square foot of filter area.

6. The process of claim 5 wherein said aqueous sugar liquor is passed through said filter cakes at a rate of 5–40 gallons per hour per square foot of filter area.

7. A process for the purification and decolorization of sugar liquors which comprises passing an aqueous sugar liquor selected from the group consisting of corn syrup and dextrose solutions through a plurality of filters connected in series, periodically cutting out the upstream filter that has been under liquor pressure for the longest time, and substantially simultaneously cutting in as the last downstream filter in the series a fresh filter containing fresh carbon filter cake, said filters containing cakes consisting essentially of powdered activated carbon of a subdivision such that at least 90% of the particles are less than 100 mesh in diameter, with said cakes each having a thickness of 1/4–1 inch.

8. The process of claim 7 wherein said corn syrup has a D.E. ranging from about 25 to about 75.

9. The process of claim 7 wherein said dextrose solution has a D.E. greater than 80.

10. The process of claim 7 wherein the average color of said sugar liquor is reduced in intensity 2–10 times its former average figure.

11. The process of claim 7 wherein prior to said filtration steps the incoming liquor is initially clarified by slurry contact with a particulate carbon source.

12. The process of claim 7 wherein said carbon cake, that is being cut out, is employed as a final decolorizing system by slurrying said carbon in the purified sugar liquor being withdrawn from the last downstream filter in the series of filters.

13. The process of claim 12 wherein the average color of said sugar liquor is reduced in intensity 2–10 times its former average figure.

14. The process of claim 12 wherein prior to said filtration steps the incoming liquor is initially clarified by slurry contact with a particulate carbon source.

15. The process of claim 7 wherein said series comprises 2 to 5 filter cakes.

16. The process fo claim 15 wherein said carbon filter cakes are composed of 0.5–1.5 pounds of the activated powdered carbon per square foot of filter area.

17. The process of claim 16 wherein said aqueous sugar liquor is passed through said carbon filter cakes at a rate of 5–40 gallons per hour per square foot of filter area.

18. A process for the purification and decolorization of sugar liquors which comprises passing an aqueous sugar liquor through a plurality of filters connected in series, periodically cutting out the upstream filter that has been under liquor pressure for the longest time when the average color of the treated liquor leaving the last filter has reached a pre-determined level, and substantially simultaneously cutting in as the last downstream filter in the series a fresh filter containing fresh carbon filter cake, said filters containing cakes consisting essentially of powdered activated carbon of a subdivision such that at least 90% of the particles are less than 100 mesh in diameter, with said filter cakes each having a thickness of 1/4–1 inch.

19. The process of claim 18 wherein the average color of said sugar liquor is reduced in intensity 2–10 times its former average figure.

20. The process of claim 18 wherein prior to said filtration steps the incoming liquor is initially clarified by slurry contact with a particulate carbon source.

21. A process for the purification and decolorization of sugar liquors which comprises passing an aqueous sugar liquor selected from the group consisting of corn syrup and dextrose through a plurality of filters connected in series, periodically cutting out the upstream filter that has been under liquor pressure for the longest time when the average color of the treated liquor leaving the last filter has reached a pre-determined level, substantially simultaneously cutting in as the last downstream filter in the series a fresh filter containing fresh carbon filter cake, said filters containing cakes consisting essentially of powdered activated carbon of a subdivision such that at least 90% of the particles are less than 100 mesh in diameter, with said filter cakes each having a thickness of 1/4–1 inch.

22. The process of claim 21 wherein the average color of said sugar liquor is reduced in intensity 2–10 times its former average figure.

23. The process of claim 21 wherein prior to said filtration steps the incoming liquor is initially clarified by slurry contact with a particulate carbon source.

References Cited

UNITED STATES PATENTS

| | | | |
|---|---|---|---|
| 1,646,079 | 10/1927 | Battelle | 127—9X |
| 1,615,846 | 2/1927 | Murrie | 127—46 |
| 2,680,082 | 6/1954 | Newkirk | 127—40 |
| 2,954,305 | 9/1960 | Grosvenor | 127—55 |
| 3,236,687 | 2/1966 | Smith | 127—46X |

OTHER REFERENCES

G. P. Meade, "Cane Sugar Handbook," Ninth Edition, 342–343, 366–372, John Wiley and Sons, Inc., New York, 1963.

MORRIS O. WOLK, Primary Examiner

S. MARANTZ, Assistant Examiner

U.S. Cl. X.R.

127—9, 55; 210—39